United States Patent
Bacon et al.

(10) Patent No.: US 11,045,947 B1
(45) Date of Patent: Jun. 29, 2021

(54) ROBOTIC GRIPPER

(71) Applicants: Aaron Thomas Bacon, Garden Grove, CA (US); Aerick William Bacon, Garden Grove, CA (US); Thomas Dell Bacon, Garden Grove, CA (US)

(72) Inventors: Aaron Thomas Bacon, Garden Grove, CA (US); Aerick William Bacon, Garden Grove, CA (US); Thomas Dell Bacon, Garden Grove, CA (US)

( * ) Notice: Subject to any disclaimer, the term of this patent is extended or adjusted under 35 U.S.C. 154(b) by 0 days.

(21) Appl. No.: 16/834,931

(22) Filed: Mar. 30, 2020

Related U.S. Application Data

(63) Continuation of application No. 16/538,728, filed on Aug. 12, 2019, now Pat. No. 10,639,790.

(51) Int. Cl.
| | |
|---|---|
| *B25J 9/16* | (2006.01) |
| *B25J 15/06* | (2006.01) |
| *B25J 15/08* | (2006.01) |
| *B25J 9/02* | (2006.01) |
| *B07C 5/34* | (2006.01) |

(52) U.S. Cl.
CPC ........... *B25J 9/1612* (2013.01); *B07C 5/3404* (2013.01); *B25J 9/023* (2013.01); *B25J 9/1669* (2013.01); *B25J 9/1679* (2013.01); *B25J 9/1694* (2013.01); *B25J 15/0616* (2013.01); *B25J 15/08* (2013.01); *B07C 2501/0063* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,365,774 A | * | 11/1994 | Horlacher | G01M 3/363 73/45.4 |
| 5,760,295 A | * | 6/1998 | Yasumoto | G01M 3/40 73/49.3 |
| 6,374,582 B1 | * | 4/2002 | Agne | B65B 43/28 53/254 |
| 6,412,253 B1 | | 7/2002 | Meyer et al. | 53/399 |
| 6,794,885 B1 | * | 9/2004 | Yasumoto | G01N 27/205 324/557 |
| 6,979,032 B2 | * | 12/2005 | Damhuis | B25J 15/0052 294/185 |
| 7,611,180 B1 | * | 11/2009 | Fisher | B25J 15/0052 294/65 |
| 9,764,675 B1 | * | 9/2017 | Theobald | B60P 1/48 |
| 9,809,333 B2 | | 11/2017 | Minamino et al. | B65B 35/38 |
| 10,207,868 B1 | * | 2/2019 | Stubbs | G06Q 10/087 |
| 2004/0134841 A1 | * | 7/2004 | Elbersen | G01M 3/36 209/601 |

(Continued)

*Primary Examiner* — Kyle O Logan
(74) *Attorney, Agent, or Firm* — Venable LLP

(57) ABSTRACT

A tool and system for inspecting, handling, sorting, and packing a sealable bag, the tool including: a housing which includes a mount for mechanically mounting the tool to a tip end of a robot arm; at least four displaceable fingers fixed to the housing in a configuration corresponding to dimensions of the sealable bag, each displaceable finger being displaceable in an axial direction of the displaceable finger and having a sensor for sensing displacement of the displaceable finger by more than a predetermined amount; a suction mechanism fixed to the housing and actuatable to lift the sealable bag; and a controller in communication with the sensor and with the suction mechanism.

6 Claims, 13 Drawing Sheets

(56) References Cited

U.S. PATENT DOCUMENTS

| | | | |
|---|---|---|---|
| 2007/0157726 A1* | 7/2007 | Engel | G01M 3/3209 |
| | | | 73/432.1 |
| 2015/0066199 A1* | 3/2015 | Shimono | B25J 9/1687 |
| | | | 700/218 |
| 2016/0167227 A1* | 6/2016 | Wellman | B25J 9/1612 |
| | | | 700/259 |
| 2019/0071196 A1* | 3/2019 | Watanabe | B65B 51/067 |
| 2019/0077011 A1* | 3/2019 | Sezaki | B25J 9/0093 |
| 2019/0228371 A1* | 7/2019 | Murphy | B25J 9/1697 |

* cited by examiner

ROBOTIC GRIPPER

This application is a continuation of application Ser. No. 16/538,728 filed Aug. 12, 2019, currently pending, the contents of all of which are incorporated herein by reference as if set forth in full.

BACKGROUND

1. Technical Field

The field generally relates to robotic end-of-arm tools and systems for the automated sorting of sealable bags and methods of use thereof.

2. Discussion of Related Art

Currently, the determining of whether a sealable bag is properly sealed and the subsequent sorting and packing of the sealable bag is a labor-intensive process with inherent inefficiencies. There remains a need for a system and method for automating the process.

SUMMARY

An embodiment of the instant disclosure herein relates to a tool for handling of a sealable bag, the tool including: a housing which includes a mount for mechanically mounting the tool to a tip end of a robot arm; a plurality of displaceable fingers such as four displaceable fingers fixed to the housing in a configuration corresponding to dimensions of the sealable bag, each displaceable finger being displaceable in an axial direction of the displaceable finger and having a sensor for sensing displacement of the displaceable finger by more than a predetermined amount; a suction mechanism fixed to the housing and actuatable to lift the sealable bag; and a controller in communication with the sensor and with the suction mechanism. The controller is configured to read the sensors so as to determine whether all of displaceable fingers in contact with the sealable bag are displaced by more than the predetermined amount, and also configured to actuate the suction mechanism responsive to a determination that all of the displaceable fingers in contact with the sealable bag are displaced by more than the predetermined amount. Confirmation sensors may be provided so as to validate that the sealable bag is captured and correctly held by the suction mechanism, such as an optical sensor or a vacuum switch or both.

An embodiment of the instant disclosure herein relates to a system for automated sorting of a sealable bag, including: a robotic arm; an end-of-arm tool mechanically mounted to a tip end of the robotic arm, the end-of-arm tool including: a housing having a mount for mechanically mounting the end-of-arm tool to the tip end of the robotic arm; a plurality of displaceable fingers fixed to the housing and configured in an orientation corresponding to a dimension of the sealable bag, each of the plurality of displaceable fingers being displaceable in an axial direction; and a retrieving member fixed to the housing and configured to contact and reversibly engage the sealable bag; a vision system; and a controller in communication with the robotic arm, the end-of-arm tool, and the vision system. When in operation, the controller is configured to detect the sealable bag based on information from the vision system, direct the robotic arm and the end-of-arm tool to contact the sealable bag based on the detection of the sealable bag such that the plurality of displaceable fingers contact a surface of the sealable bag and apply a pressure to the surface of the sealable bag to determine whether the sealable bag is fully sealed or not fully sealed, and to direct the retrieving member to contact and engage the sealable bag based on whether the sealable bag is fully sealed or not fully sealed. Based on a determination of whether the sealable bag is properly sealed or not, the sealable bag is transported to a packaging station and a container for packaging, or to a discard station and receptacle for discarding.

An embodiment of the instant disclosure herein relates to an automated method for sorting a sealable bag including the steps of detecting the sealable bag; applying a pressure to the sealable bag to determine whether the sealable bag is fully sealed or not fully sealed; and retrieving the sealable bag based on whether the sealable bag is fully sealed or not fully sealed. A vision system, such as a camera, in communication with a controller, is used to detect an orientation of the sealable bag such as its 360 degree orientation on a conveyor belt. The controller directs a robotic arm, and an end-of-arm tool mechanically mounted to the robotic arm is used to apply the pressure to the sealable bag based on a detection of the sealable bag such that a plurality of displaceable fingers fixed on a housing of the end-of-arm tool contact a surface of the sealable bag and apply the pressure to the sealable bag to determine whether the sealable bag is fully sealed or not fully sealed. The controller directs a retrieving member fixed to the housing of the end-of-arm tool to contact and reversibly retrieve the sealable bag based on whether the sealable bag is fully sealed or not fully sealed. Confirmation sensors may be provided to validate that the sealable bag is captured and correctly held by the retrieving member. The controller directs the robotic arm to transport the sealable bag to a predetermined location based on whether the sealable bag is fully sealed or not fully sealed. Based on a determination of whether the sealable bag is properly sealed or not, the sealable bag is transported to a packaging station and a container for packaging, or to a discard station and receptacle for discarding.

BRIEF DESCRIPTION OF THE DRAWINGS

Further objectives and advantages will become apparent from a consideration of the description, drawings, and examples.

DETAILED DESCRIPTION

Some embodiments of the current disclosure herein are discussed in detail below. In describing embodiments, specific terminology is employed for the sake of clarity. However, the disclosure herein is not intended to be limited to the specific terminology so selected. A person skilled in the relevant art will recognize that other equivalent components can be employed and other methods developed without departing from the broad concepts of the current disclosure herein. Any reference cited anywhere in this specification, including the Background and Detailed Description sections, is incorporated by reference in its entirety.

In general, embodiments of the disclosure involve an end-of-arm-tool in the form of a robotic gripper, designed for mounting to the end of a robotic arm for automated packaging of snack-sized bags, flexible wrapped packages, pouches, sachet, and/or pillow packs and methods of use thereof.

Figure 1:
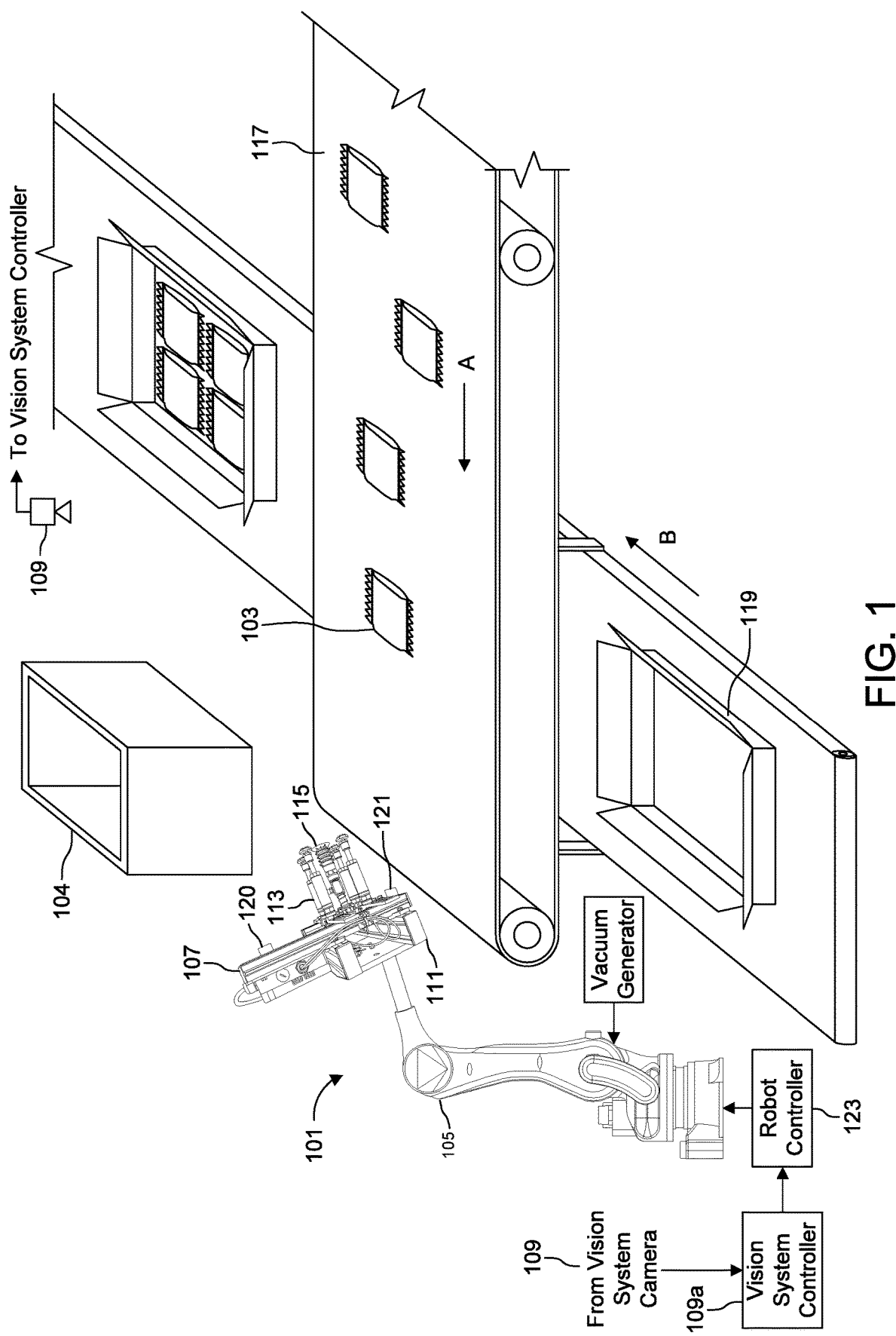
FIG. 1 is an overview showing a 6-axis robotic arm with an end-of-arm tool mounted at its tip, positioned against a pair of perpendicular conveyors, with sealed bags being conveyed in direction A for testing and packaging by the end-of-arm tool into boxes conveyed in direction B according to an embodiment of the disclosure herein.

FIG. 1 is a schematic illustrating an example embodiment of the disclosure. In FIG. 1, a robotic system 101 is used for the automated sorting and packing of a sealable bag 103 or an unsealed bag. The robotic system includes a robotic arm 105; an end-of-arm tool 107 mechanically mounted to a tip end of the robotic arm; a vision system 109; and a controller 123 in communication with the robotic arm, the end-of-arm tool, and the vision system. The end-of-arm tool includes a housing 111 comprising a mount for mechanically mounting the end-of-arm tool to the tip end of the robotic arm; a plurality of displaceable fingers 113 fixed to the housing and configured in an orientation corresponding to a dimension of the sealable bag, each of the plurality of displaceable fingers being displaceable in an axial direction; and a retrieving member 115 fixed to the housing and configured to contact and reversibly engage the sealable bag.

End-of-arm tool 107 may further include one or more confirmation sensors to validate that retrieving member 115, once actuated, has captured and correctly holds a sealable bag. In this embodiment, a vacuum switch 120 and optical sensor 121 are provided.

Vision system 109 includes a camera 109 and vision system controller 109a and is configured to image sealable bags 103 as they are conveyed by conveyor 117 to an inspection station. It is expected that the bags are not somehow pre-sorted or aligned, and that they therefore arrive at the inspection station in random (arbitrary) alignments and orientations. Vision system 109 images the bags as they arrive at the inspection station, determines their 360 degree orientation, and orients the robotic arm 105 so that the end-of-arm tool 107 matches the orientation of the bag, to permit testing of the seal of the bag.

FIG. 1 also illustrates use of the robotic system. In FIG. 1, the vision system 109 locates each bag 103 as it is conveyed on a conveyor 117 in a direction A. The end-of-arm tool then performs a tactile test of each bag for integrity of its air-tight seal. If the seal is intact, the retrieving member engages the bag and packs it into an open box 119 conveyed in a direction B, whereas the bag is discarded to discard bin 104 if it is not intact.

The robotic system of FIG. 1 also includes on its housing a vacuum switch 120 and an optical sensor 121. The vacuum switch 120 interacts with the retrieving member and produces and/or validates a vacuum when the retrieving member is reversibly engaged with the sealable bag. The optical sensor 121 includes a sensor and serves as a secondary sensor to validate that the sealable bag has been reversibly engaged by the retrieving member.

The terms "end-of-arm tool" and "gripper" are used interchangeably throughout and relate to a mechanical device that is configured to be mechanically coupled to a robotic arm.

The terms "displaceable finger" and "fingers" are used interchangeably throughout and relate to a plurality of displaceable mechanical units mounted onto an end-of-arm tool. The units are used for at least registering a displacement following contact with a surface of a sealable bag, where the level of displacement is indicative of whether the sealable bag is properly sealed or not. The units are configured such that they correspond to a dimension of the sealable bag and their positioning may be adjustable in for this purpose. Those of ordinary skill will recognize that they can be arranged in any configuration so long as the configuration corresponds to a dimension of the sealable bag that will be contacted.

The term "retrieving member" as used throughout refers to a mechanical unit mounted onto an end-of-arm tool and used for reversibly engaging a sealable bag. In some embodiments, the retrieving member 115 includes a spring-mounted suction mechanism 207 to reversibly engage the sealable bag, however additional mechanisms for reversible engaging the sealable bag can be envisioned.

The term "controller" refers to a component configured to interact with and at least partially command operation of various components including, but not limited to an end-of-arm tool and all related components (e.g. a retrieving member and displaceable fingers, and corresponding sensors), a robotic arm, and a vision system. The controller commands operation of various components at least in part based on information received from the various components. In some embodiments, the controller comprises a processor and/or a software component.

The term "vision system" as used throughout includes a camera detecting optical information, and refers to a system configured for sensing the position and a 360 degree orientation of the sealable bag.

The term "vacuum switch" refers to a structure or sensor configured to interact with a retrieving member and to provide and/or validate sufficient pressure to ensure that a vacuum is achieved when a sealable bag is engaged by the retrieving member.

The term "optical sensor" refers to a structure configured to detect and confirm that a sealable bag is engaged by a retrieving member.

The term "sealable bag" (also referred to as a sachet, pouch, or pillow) refers to a sealable container for carrying a product. The sealable bag might or might not be sealed.

In some embodiments, the end-of-arm tool, or gripper, has a plurality of plate-mounted sensing fingers spaced in a rectangular conformation in correspondence to the dimensions of the bag. In some embodiments, the plurality of plate-mounted sensing fingers includes four plate-mounted sensing fingers. These fingers are aligned by the vision system to match the orientation of the bag as it is conveyed, and are pressed by the gripper onto the surface of each bag. If all of the plurality of sensors register sufficient displacement of the fingers, the bag is determined to be intact, much like a human operator who gently squeezes a bag to test for resilience. If any of the sensors does not displace adequately, then it is determined that the bag is not intact (the air-tight seal might be broken or the bag might be empty or nearly so).

In some embodiments, a suction cup is also mounted to the same plate as the sensing fingers for retrieving the bag. Once a determination is made for a bag (i.e., go or no go), the suction cup is actuated to lift the bag for packaging or for discarding, as the case may be. Based on a determination of whether the sealable bag is properly sealed or not, the suction cup engages the sealable bag and either transports it to a packaging station and a container for packaging, or to a discard station and receptacle for discarding.

In some embodiments, the end-of-arm tool is mechanically coupled to a robotic arm. Examples of suitable mechanical arms are well known to one of ordinary skill in the art. Any robotic arm can be used so long as it provides adequate degrees of freedom, such as 6 degrees of freedom. In some embodiments, a 6-axis robotic arm is adapted to receive the end-of-arm tool described above and throughout.

Device

Embodiments of the device described throughout possess a tool for testing and handling of a sealable bag or unsealed bag, the tool including: a housing which includes a mount for mechanically mounting the tool to a tip end of a robot arm; a plurality of displaceable fingers fixed to the housing in a configuration corresponding to dimensions of the sealable bag, each displaceable finger being displaceable in an axial direction of the displaceable finger and having a sensor for sensing displacement of the displaceable finger by more than a predetermined amount; a suction mechanism fixed to the housing and actuatable to lift the sealable bag; and a controller in communication with the sensor and with the suction mechanism. The controller is configured to read the sensors so as to determine whether all of the plurality of displaceable fingers in contact with the sealable bag are displaced by more than the predetermined amount, and also configured to actuate the suction mechanism responsive to a determination that all of the plurality of displaceable fingers in contact with the sealable bag are displaced by more than the predetermined amount.

Embodiments of the device described throughout possess the tool above, where the controller is further configured to provide a signal to the robot arm to move the tool to a packaging station responsive to a determination that all of the plurality of displaceable fingers in contact with the sealable bag are displaced by more than the predetermined amount, and is further configured to provide a signal to the robot arm to move the tool to a discard station responsive to a determination that fewer than all of the plurality of displaceable fingers in contact with the sealable bag are displaced by more than the predetermined amount.

Embodiments of the device described throughout possess the tool above, where the controller is further configured to deactivate the suction mechanism to drop the sealable bag responsive to a signal from the robot arm to the controller that the tool is positioned at a packaging station or positioned at a discard station.

Embodiments of the device described throughout possess the tool above, further including a check valve or vacuum switch configured to signal that a set level of vacuum is achieved for the suction mechanism; and an optical sensor configured confirm that the suction mechanism, once actuated by the controller, has successfully adhered to and lifted the sealable bag. In such an embodiment, the controller is further configured to provide a signal to the robot arm to move the tool to a packaging station responsive to a determination of both of (1) that the optical sensor confirms that the suction mechanism has successfully adhered to and lifted the sealable bag, and (2) that all of the plurality of displaceable fingers in contact with the sealable bag are displaced by more than the predetermined amount.

Embodiments of the device described throughout possess the tool above, where the controller is further configured to provide a signal to the robot arm to move the tool to a packaging station responsive to a determination of both of (1) that the optical sensor confirms that the suction mechanism has successfully adhered to and lifted the sealable bag, and (2) that all of the plurality of displaceable fingers in contact with the sealable bag are displaced by more than the predetermined amount.

Embodiments of the device described throughout possess the tool above, where each of the displaceable fingers is spring loaded by a spring and biased by the spring toward a fully extended position, wherein a spring constant of the spring is strong enough for durability over time but not so strong as to apply too much pressure to a sealed bag and rupture a seal on the sealable bag.

An example embodiment of the disclosure is depicted in FIGS. 2A-2D. FIGS. 2A-2D are plan, left and right elevations, and perspective views, respectively, of an end-of-arm tool 107 of FIG. 1 and according to an embodiment of the disclosure herein. The end-of-arm tool 107 of FIGS. 2A-2D includes: a housing 111 which includes a mount for mechanically mounting the tool to a tip end of a robot arm; a plurality of displaceable fingers 113 fixed to the housing in a configuration corresponding to dimensions of the sealable bag, each displaceable finger being displaceable in an axial direction of the displaceable finger and having a sensor 206 for sensing displacement of the displaceable finger by more than a predetermined amount; a suction mechanism 207 fixed to the housing and actuatable to lift the sealable bag; a vacuum check valve (or vacuum switch) 120 to validate the bag is present and adhered by the vacuum to suction mechanism 207 for the entirety of the time it is picked up until it is deposited in an open box; and a controller 209 in communication with the sensor and with the suction mechanism 207. The controller 209 is configured to read the sensors so as to determine whether all of the displaceable fingers 113 in contact with the sealable bag are displaced by more than the predetermined amount, and also configured to actuate the suction mechanism responsive to a determination that all of the displaceable fingers 113 in contact with the sealable bag are displaced by more than the predetermined amount.

The displaceable fingers are operable primarily while the sealable bag remains on conveyor 117. After actuation of suction mechanism 207, the vacuum switch 120 and/or optical sensor 121 are used to validate that the sealable bag is attached to the suction mechanism, such as during movement of the bag to a packaging station or during discarding.

Figure 2A:
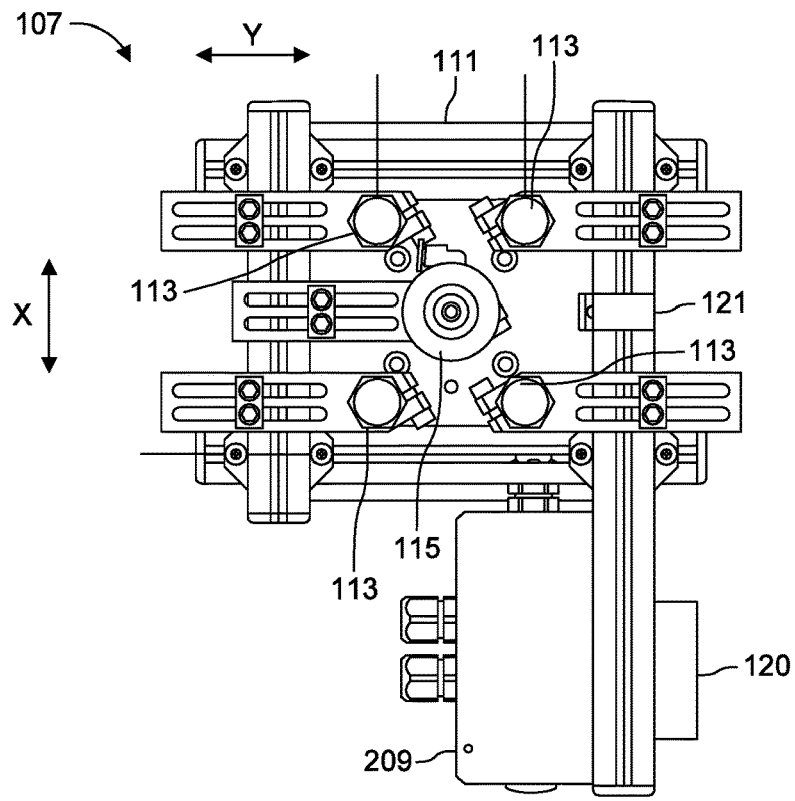
FIGS. 2A-2D are plan, left and right elevations, and perspective views, respectively, of an end-of-arm tool according to an embodiment of the disclosure herein.
Figure 2B:
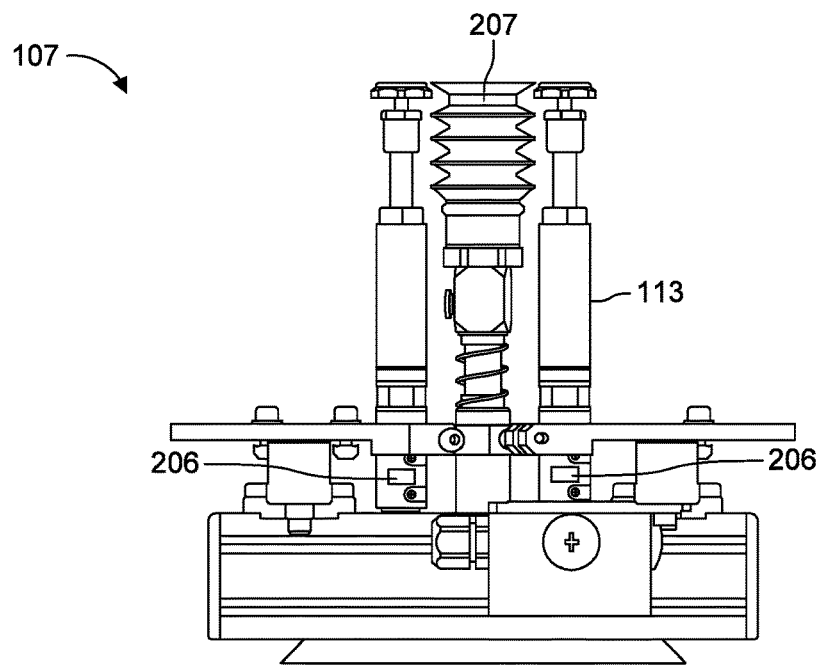
Figure 2C:
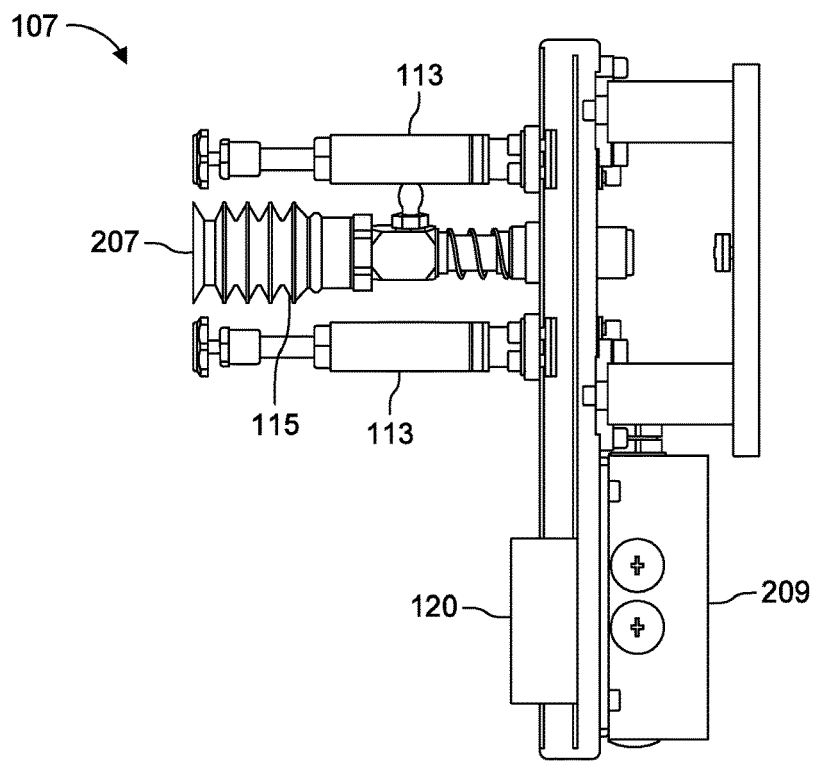
Figure 2D:
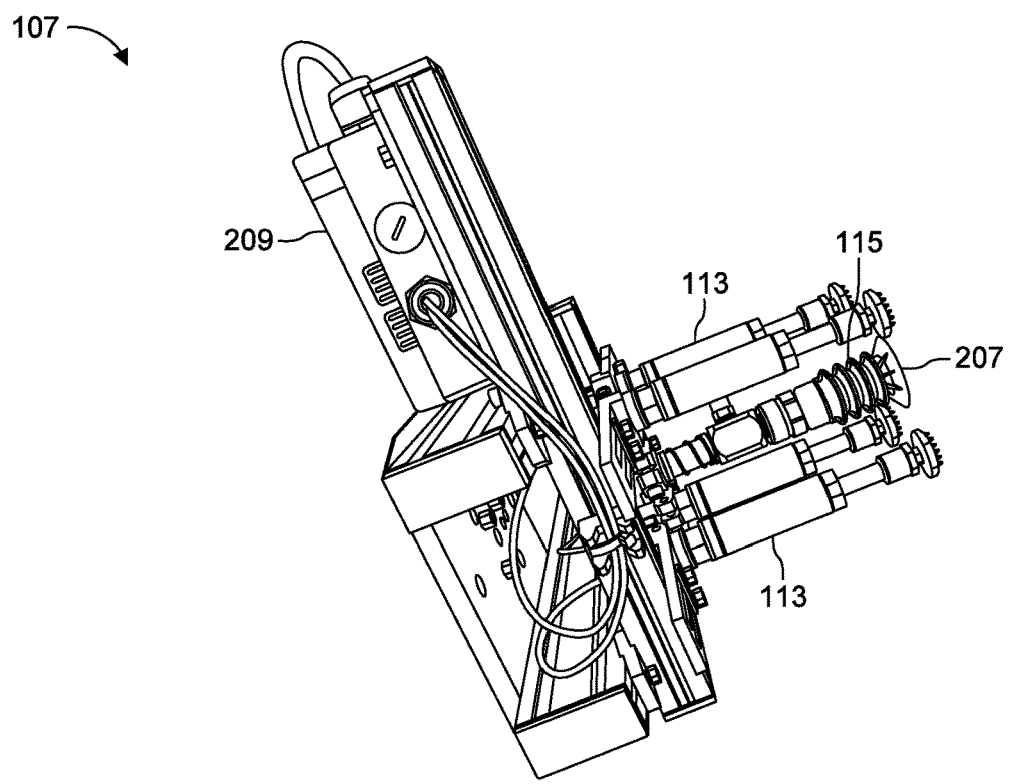

Also, the displaceable figures are mounted onto the end-of-arm tool such that they can be adjusted horizontally across width of the end-of-arm tool (as denoted by the left and right arrows in FIG. 2A) and such that they can be adjusted vertically along the length of the end-of-arm tool (as denoted by the X and Y arrows in FIG. 2A).

Each of the displaceable fingers further includes an internal spring (not shown) for biasing of the displaceable finger against the sealable bag. The spring in the displaceable fingers has a spring constant adequate to ensure that not too much pressure is applied to pop a sealed bag, but at the same time is strong enough for durability over time.

Figure 4:
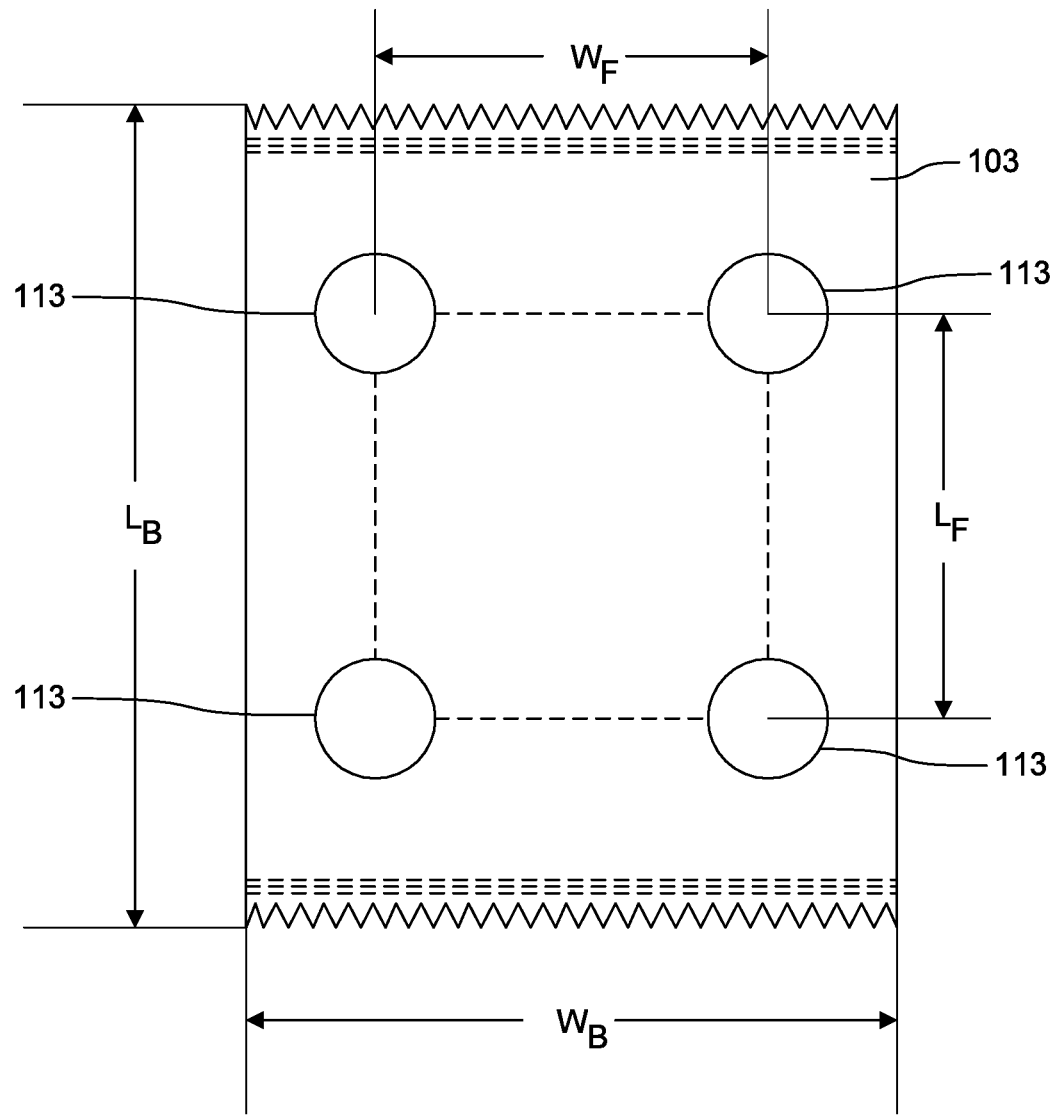
FIG. 4 is a plan view showing the relative spacing of displaceable fingers on an end-of-arm tool with respect to the dimensions of a sealed bag according to an embodiment of the disclosure herein.

In example embodiments, the displaceable fingers are configured such that they correspond to dimensions of a sealable bag. FIG. 4 is a plan view showing the relative spacing of four displaceable fingers 113 with respect to the dimensions of a sealed bag 103. The overall length and width covered by the four displaceable fingers 113 is denoted by $L_F$ and $W_F$, while the overall length and width of the sealable bag 103 is denoted by $L_B$ and $W_B$. Those of ordinary skill will recognize that the configuration of the fingers can be altered to reflect dimensions of alternative containers for testing.

In the example embodiment of FIG. 4, the following dimensions are provided:

$$L_F \times W_F = 3.00 \text{ inches} \times 2.50 \text{ inches}$$

$$L_B \times W_B = 6.25 \text{ inches} \times 5.50 \text{ inches}$$

The length and width of the bag (i.e., $L_B \times W_B = 6.25$ inches×5.50 inches) corresponds to 4.50 inches at the narrowest waist of a sealed bag under inspection with the correct amount of air sealed inside it, and the length and width of the fingers (i.e., $L_F \times W_F = 3.00$ inches×2.50 inches) are selected in consideration of the size of the sealed bag and good positioning for testing of the seal by pressing the fingers against the bag. In some embodiments, the displaceable figures are mounted onto the end-of-arm tool such that they can be adjusted horizontally across width of the end-of-arm tool and such that they can be adjusted vertically along the length of the end-of-arm tool so that sealable bags of varying dimensions can be accommodated.

System

An embodiment of the disclosure herein relates to a system for automated inspecting, sorting and/or packaging of a sealable bag, including: a robotic arm; an end-of-arm tool mechanically mounted to a tip end of the robotic arm, the end-of-arm tool including: a housing having a mount for mechanically mounting the end-of-arm tool to the tip end of the robotic arm; a plurality of displaceable fingers fixed to the housing and configured in an orientation corresponding to a dimension of the sealable bag, each of the plurality of displaceable fingers being displaceable in an axial direction; and a retrieving member fixed to the housing and configured to contact and reversibly engage the sealable bag; an vision system; and a controller in communication with the robotic arm, the end-of-arm tool, and the vision system. When in operation, the controller is configured to detect the sealable bag based on information from the vision system, direct and orient the robotic arm and the end-of-arm tool to contact the sealable bag based on the detection of the sealable bag such that the plurality of displaceable fingers contact a surface of the sealable bag and apply a pressure to the surface of the sealable bag to determine whether the sealable bag is fully sealed or not fully sealed, and to direct the retrieving member to contact and engage the sealable bag. Based on a determination of whether the sealable bag is properly sealed or not, the sealable bag is then transported to a packaging station and a container for packaging, or to a discard station and receptacle for discarding.

An embodiment of the disclosure herein relates to the system for automated inspecting, sorting and/or packaging of a sealable bag discussed above, where the controller is further configured to direct the robotic arm to transport the sealable bag to a predetermined location based on whether the sealable bag is fully sealed or not fully sealed.

An embodiment of the disclosure herein relates to the system for automated inspecting, sorting and/or packaging of a sealable bag discussed above, where the controller is further configured to direct the robotic arm to transport the sealable bag to a packaging station or to a discard station based on whether the sealable bag is fully sealed or not fully sealed.

An embodiment of the disclosure herein relates to the system for automated inspecting, sorting and/or packaging of a sealable bag discussed above, where each of the plurality of displaceable fingers comprises a sensor configured to register a displacement of the displaceable finger by more than a predetermined amount, and where the controller is further configured read the sensors so as to determine whether all of the plurality of displaceable fingers in contact with the sealable bag are displaced by more than the predetermined amount.

An embodiment of the disclosure herein relates to the system for automated inspecting, sorting and/or packaging of a sealable bag discussed above, where the controller is further configured to actuate the retrieving member so as to retrieve the bag, and then to move the bag to an appropriate packaging or discard station responsive to a determination that all of the plurality of displaceable fingers in contact with the sealable bag are or are not displaced by more than the predetermined amount.

An embodiment of the disclosure herein relates to the system for automated inspecting, sorting and/or packaging of a sealable bag discussed above, where the retrieving member includes a suction mechanism coupled to a proximal end.

An embodiment of the disclosure herein relates to the system for automated inspecting, sorting and/or packaging of a sealable bag discussed above, further having a check valve configured to signal that a set level of vacuum is achieved for the suction mechanism; and an optical sensor configured confirm that the suction mechanism, once actuated by the controller, has successfully adhered to and lifted the sealable bag.

An embodiment of the disclosure herein relates to the system for automated inspecting, sorting and/or packaging of a sealable bag discussed above, where the controller is further configured to deactivate the suction mechanism to drop the sealable bag responsive to a signal from the robot arm that the end-of-arm tool is positioned at a packaging station or positioned at a discard station.

An embodiment of the disclosure herein relates to the system for automated inspecting, sorting and/or packaging of a sealable bag discussed above, where the robotic arm is configured to operate in at least 6 degrees of freedom.

Figure 3:
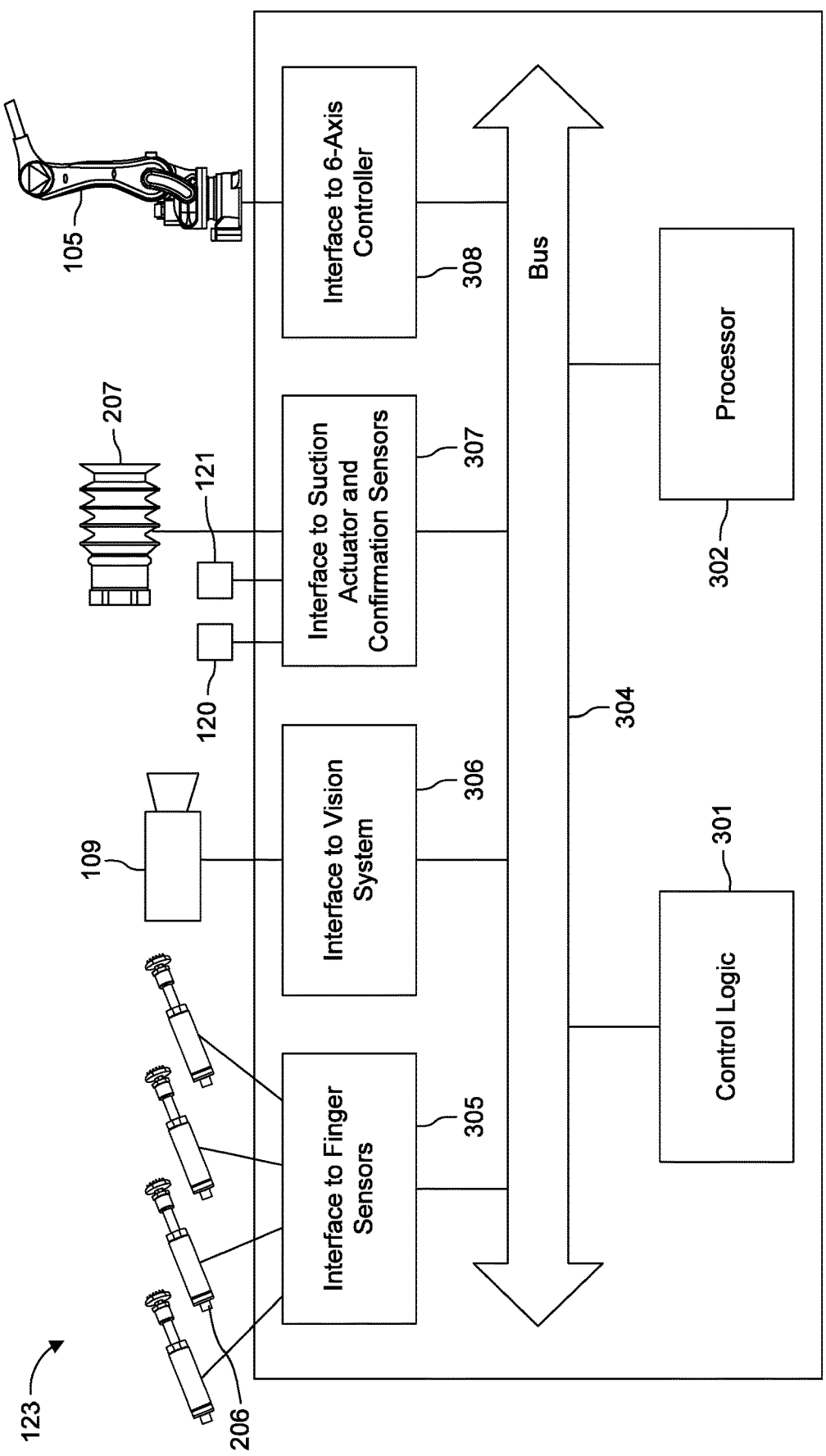
FIG. 3 is a block diagram of a circuitry according to an embodiment of the disclosure herein.

In embodiments disclosed throughout, operation of the system is at least in part coordinated by a controller 123 comprising the circuitry illustrated in FIG. 3. As shown in FIG. 3, the controller is in communication with each of the fingers and sensors, vision or optical system, suction actuator on the retrieving member, and the robotic arm.

In more detail, as shown in FIG. 3, controller 123 includes control logic 301 and processor 302 connected to bus 304. Also connected to bus 304 are interfaces 305, 306, 307 and 308 respectively for interfacing to sensors 206 on the displaceable fingers, to vision system 109, to suction mechanism 207 and confirmation sensors (e.g. check vacuum valve 120 and optical sensor 121), and to robot arm 105. Under control of the control logic 301 and processor 302, controller 123 (see FIG. 1) operates system 101 for orientation of the end-of-arm tool 107 to match the orientation of sealable bags conveyed to an inspection station, inspection of the seal of the bag at the inspection station, and packaging or discarding sealable bags in dependence on testing for a proper seal, as described throughout.

Method

An embodiment of the instant disclosure herein relates to an automated method for sorting a sealable bag including the steps of detecting the sealable bag; applying a pressure to the sealable bag to determine whether the sealable bag is fully sealed or not fully sealed; and retrieving the sealable bag based on whether the sealable bag is fully sealed or not fully sealed. A vision system in communication with a controller is used to detect the sealable bag. The controller directs a robotic arm, and an end-of-arm tool mechanically mounted to the robotic arm is used to apply the pressure to the sealable bag based on a detection of the sealable bag such that a plurality of displaceable fingers fixed on a housing of the end-of-arm tool contact a surface of the sealable bag and apply the pressure to the sealable bag to determine whether the sealable bag is fully sealed or not fully sealed. The controller directs a retrieving member fixed to the housing of the end-of-arm tool to contact and reversibly retrieve the sealable bag based on whether the sealable bag is fully sealed or not fully sealed. The controller directs the robotic arm to transport the sealable bag to a predetermined location based on whether the sealable bag is fully sealed or not fully sealed.

An embodiment of the instant disclosure herein relates to the automated method for sorting a sealable bag discussed above, where the controller directs the robotic arm to transport the sealable bag to a packaging station or to a discard station based on whether the sealable bag is fully sealed or not fully sealed.

An embodiment of the instant disclosure herein relates to the automated method for sorting a sealable bag discussed above, where each of the plurality of displaceable fingers includes a sensor configured to register a displacement of the displaceable finger by more than a predetermined amount, and where the controller is further configured read the sensors so as to determine whether all of the plurality of displaceable fingers in contact with the sealable bag are displaced by more than the predetermined amount, and where the controller is further configured to actuate the retrieving member responsive to a determination that all of the plurality of displaceable fingers in contact with the sealable bag are displaced by more than the predetermined amount.

Figure 5:
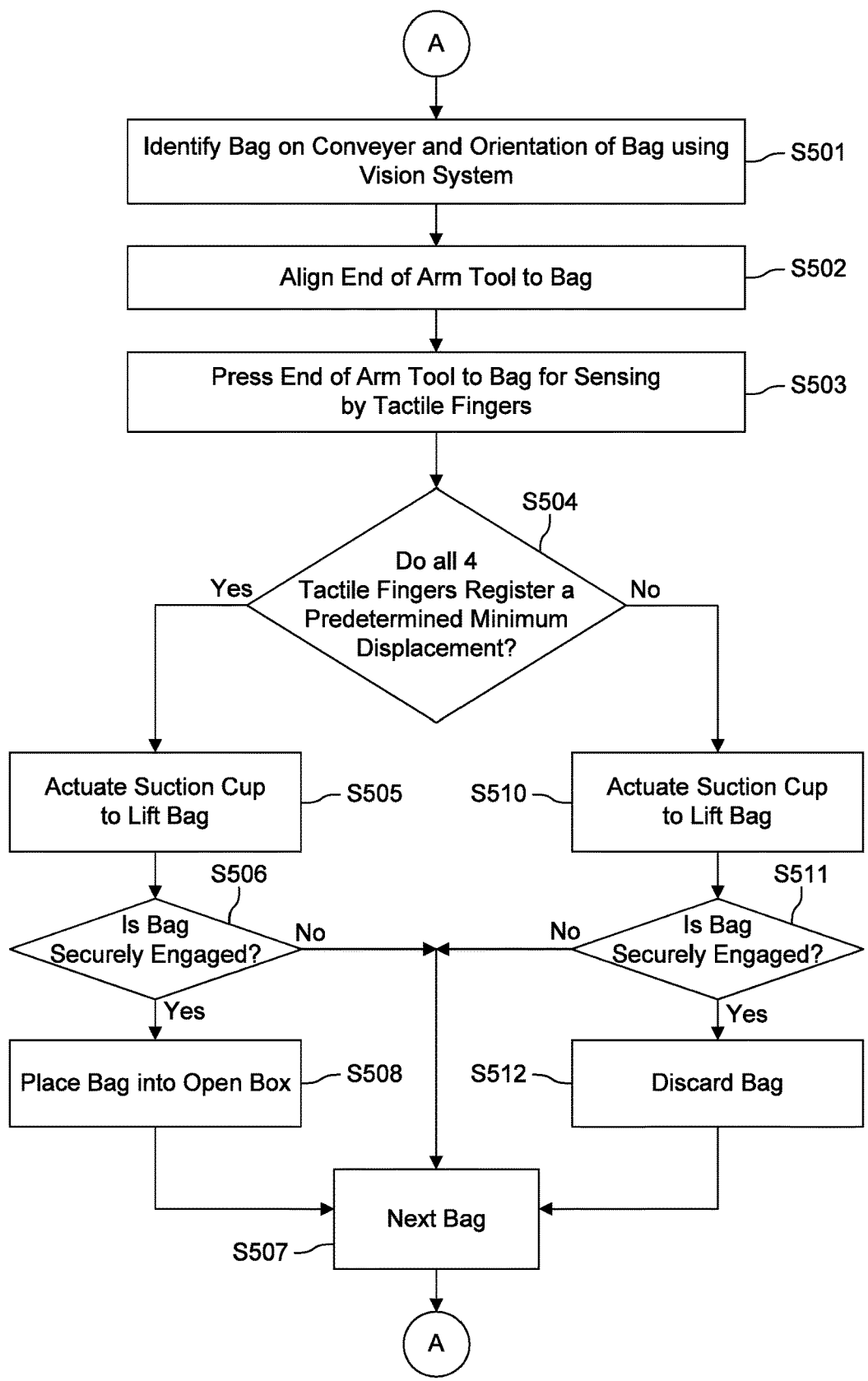
FIG. 5 is a flow diagram depicting an example method for the automated sorting of sealable bags according to an embodiment of the disclosure herein.

An embodiment of the instant disclosure herein relates to the automated method for sorting a sealable bag as depicted in FIG. 5. In step S501 of FIG. 5, a target sealable bag is initially identified by a vision system. Next, at step S502 an end of arm tool is aligned over the sealable bag and controlled to press against the sealable bag at step S503. Step S504 test whether the sealable bag is properly sealed. Specifically, if all of the displaceable fingers (or tactile fingers) on the gripper become displaced as the sealed bag offers resistance, step S504 determines that the bag is properly sealed, and flow proceeds to step S505. At step S505, and in response to registration of a predetermined minimum displacement, a suction mechanism 207 on the gripper is actuated to lift the bag. In step S506, outputs from confirmation sensors such as vacuum check valve 120 and optical sensor 121 are inspected to validate that a vacuum is achieved and that the bag is securely engaged with the suction cup.

If step S506 determines that the bag is not securely engaged by suction mechanism 207, flow branches to step S507 for processing of the next bag. The bag that should have been engaged by the suction mechanism, but was not, is allowed to fall off the end of the conveyor.

On the other hand, if step S506 determined that the bag is securely engaged, flow advances to step S508 where the bag is moved to a packaging station and released into an open box. Flow then advances to step S507 for processing of a next bag.

Returning to step S504 all of the displaceable fingers (or tactile fingers) on the gripper fail to become displaced as the sealed bag offers resistance, step S504 determines that the bag is not properly sealed, and flow proceeds to step S510. More specifically, at step S504, if the sealable bag is not properly sealed, one or more of the displaceable fingers (or tactile fingers) on the gripper will fail to become displaced as the sealed bag offers a reduced resistance. In response to the lack of registration of a predetermined minimum displacement, flow advances to step S510 where the suction cup on the gripper is actuated to lift the bag.

If step S511 determines that the bag is not securely engaged by suction mechanism 207, flow branches to step S507 for processing of the next bag. The bag that should have been engaged by the suction mechanism, but was not, is allowed to fall off the end of the conveyor.

On the other hand, if step S511 determined that the bag is securely engaged, flow advances to step S512 where the bag is moved to a discarding station 104 and released into an open box. Flow then advances to step S507 for processing of a next bag.

FIGS. 6A-6F show a sequence of a tactile sensing operation using an end-of-arm tool according to an embodiment of the disclosure. In these figures, it is assumed that the robotic system 101 includes 4 (four) LEDs 609 arrayed in correspondence to the displaceable fingers and lighted by the controller to show the state of sensors 206, e.g., an unlit state if the sensor fails to sense displacement of the finger by more than the predetermined amount, and a lit state if the sensor senses displacement of the finger by more than the predetermined amount.

Figure 6A:
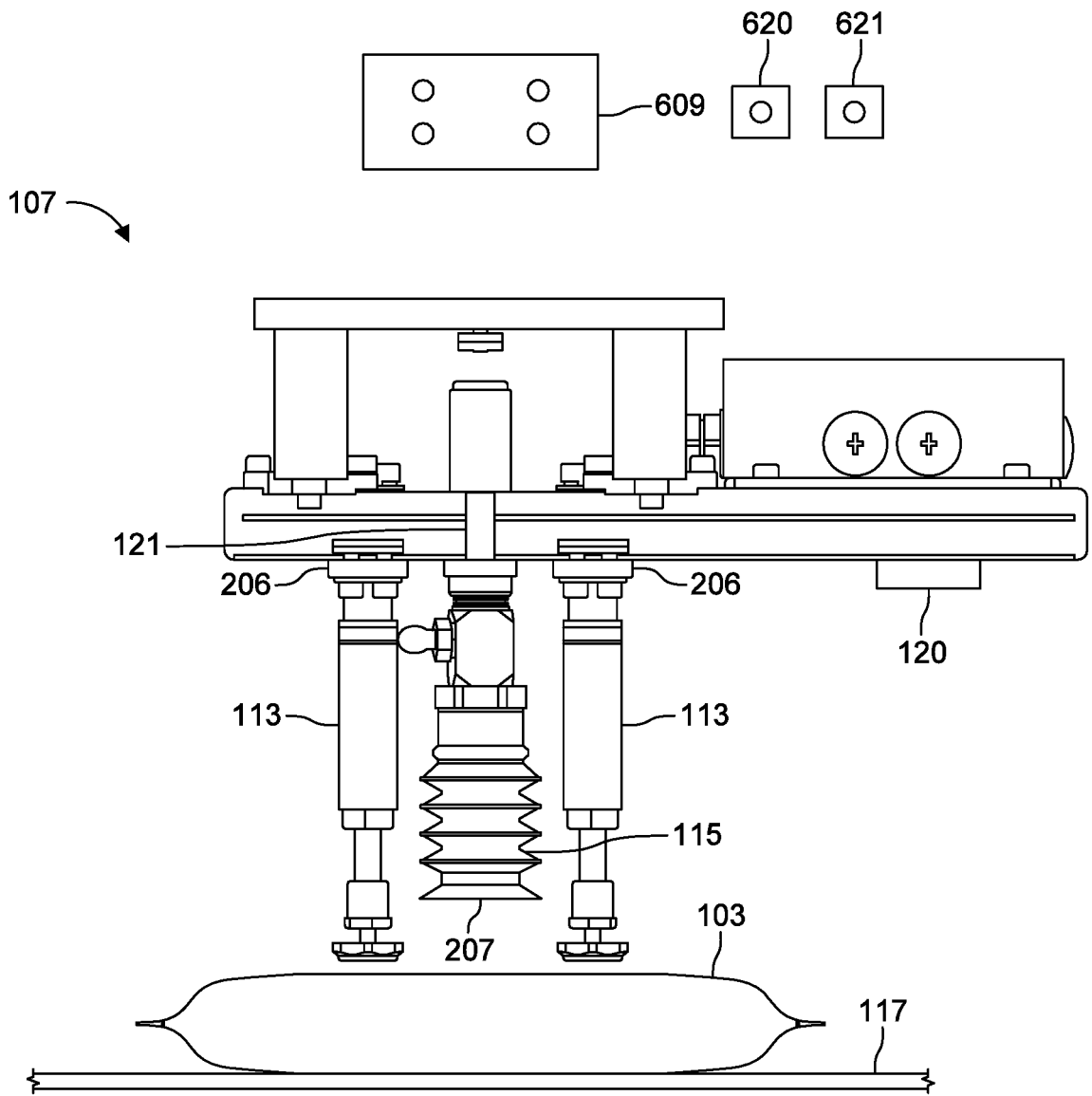
FIGS. 6A-6F show a sequence of a tactile sensing operation according to an embodiment of the disclosure herein.
Figure 6B:
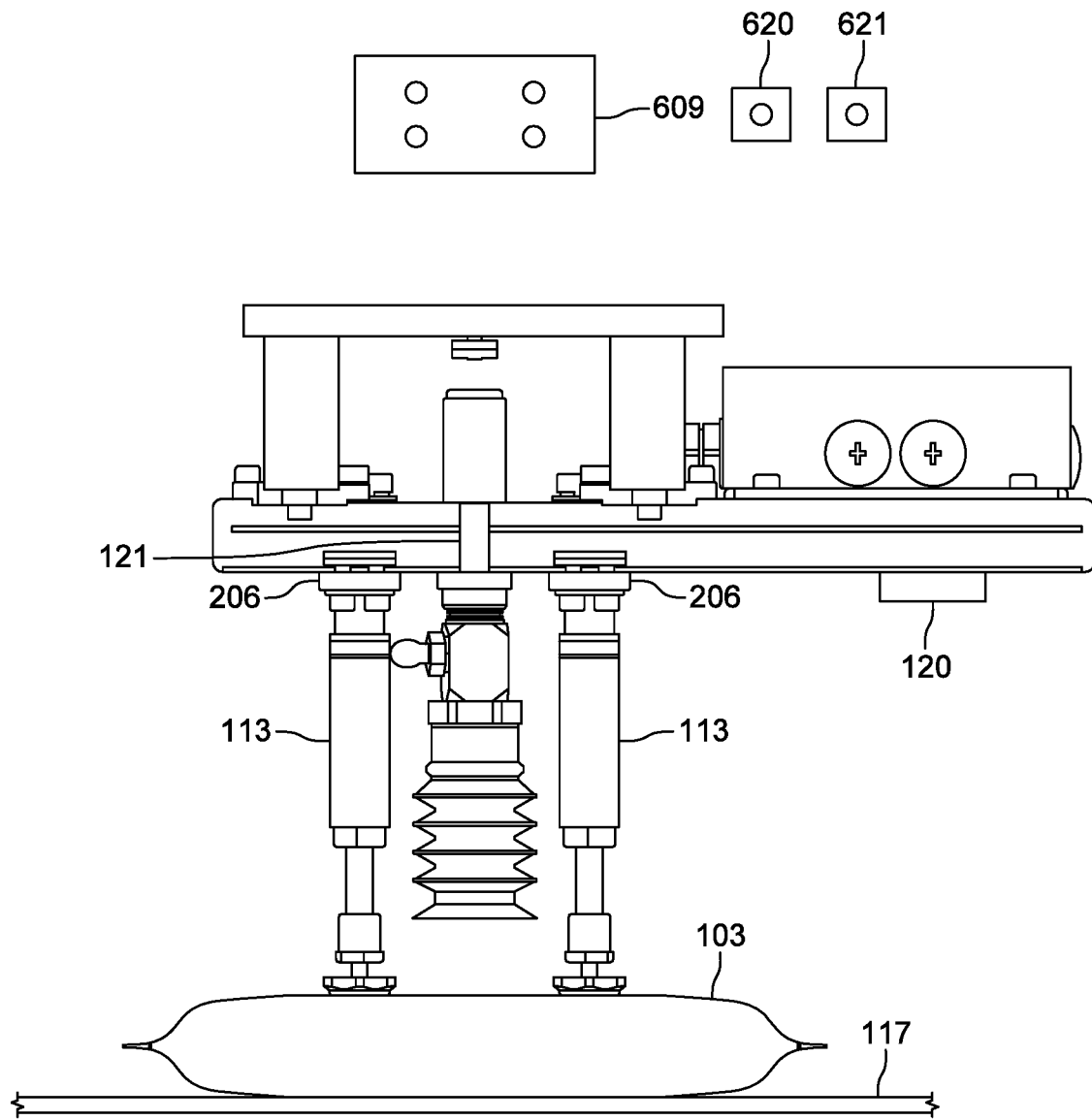
Figure 6C:
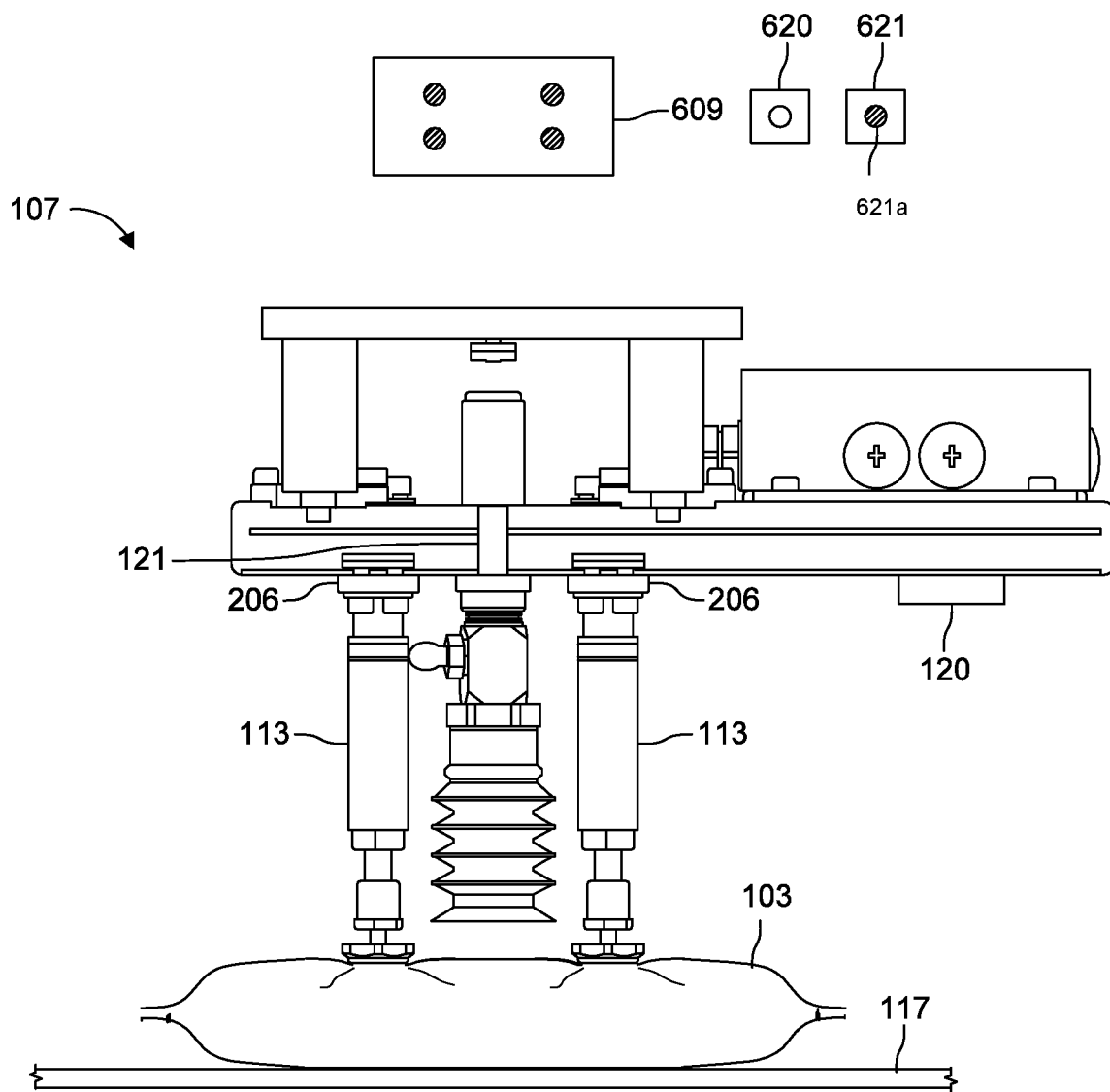
Figure 6D:
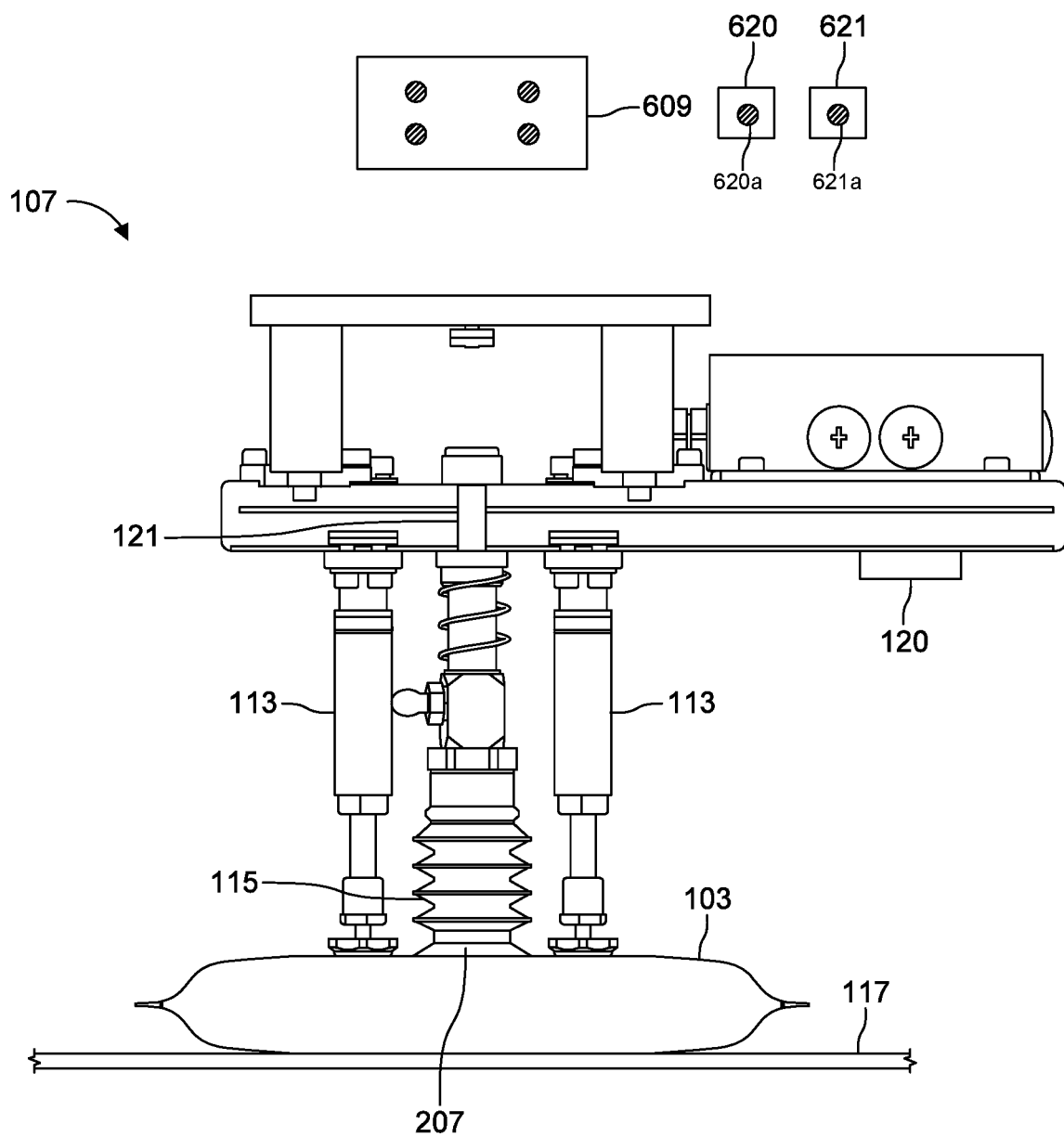
Figure 6E:
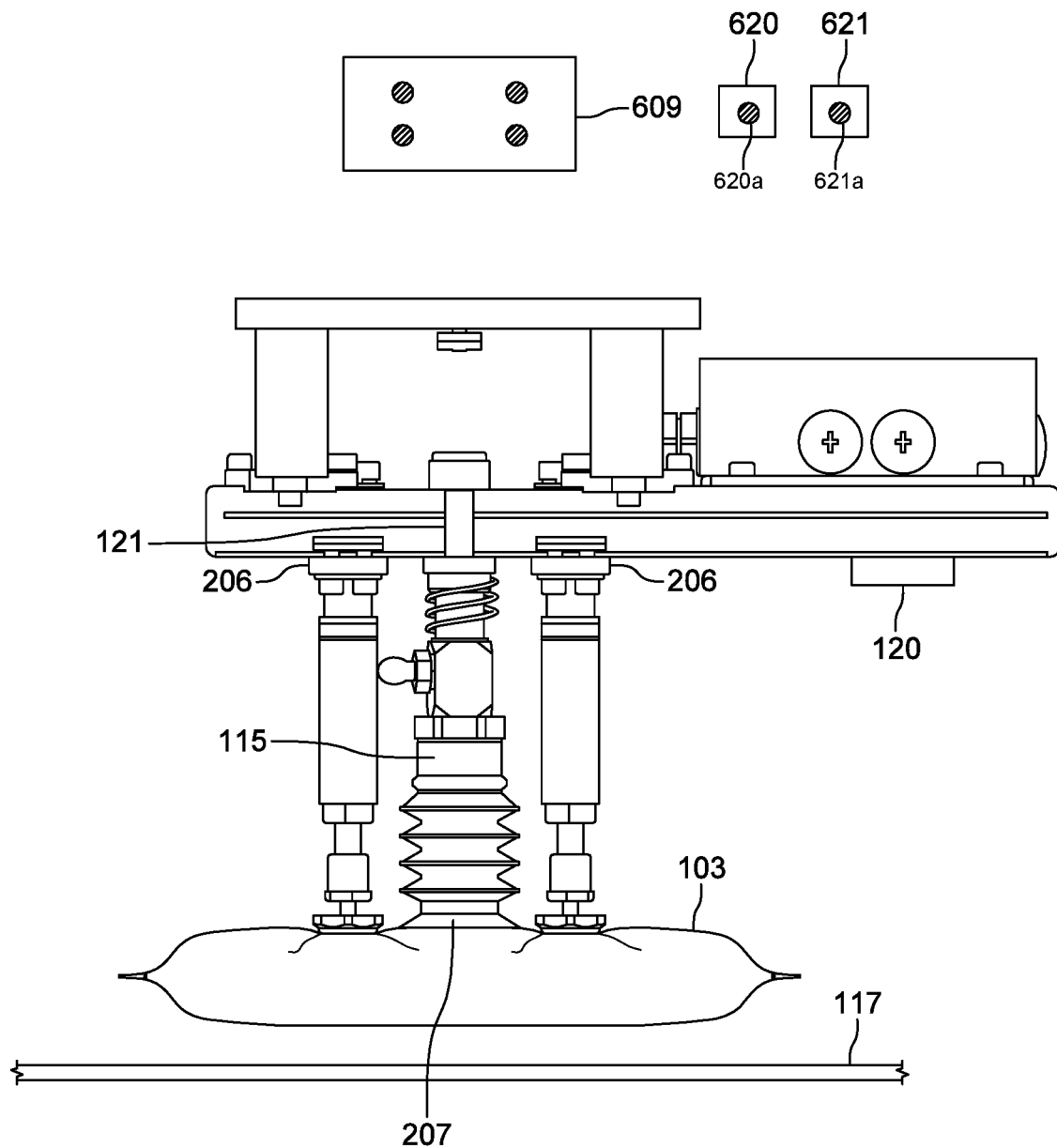
Figure 6F:
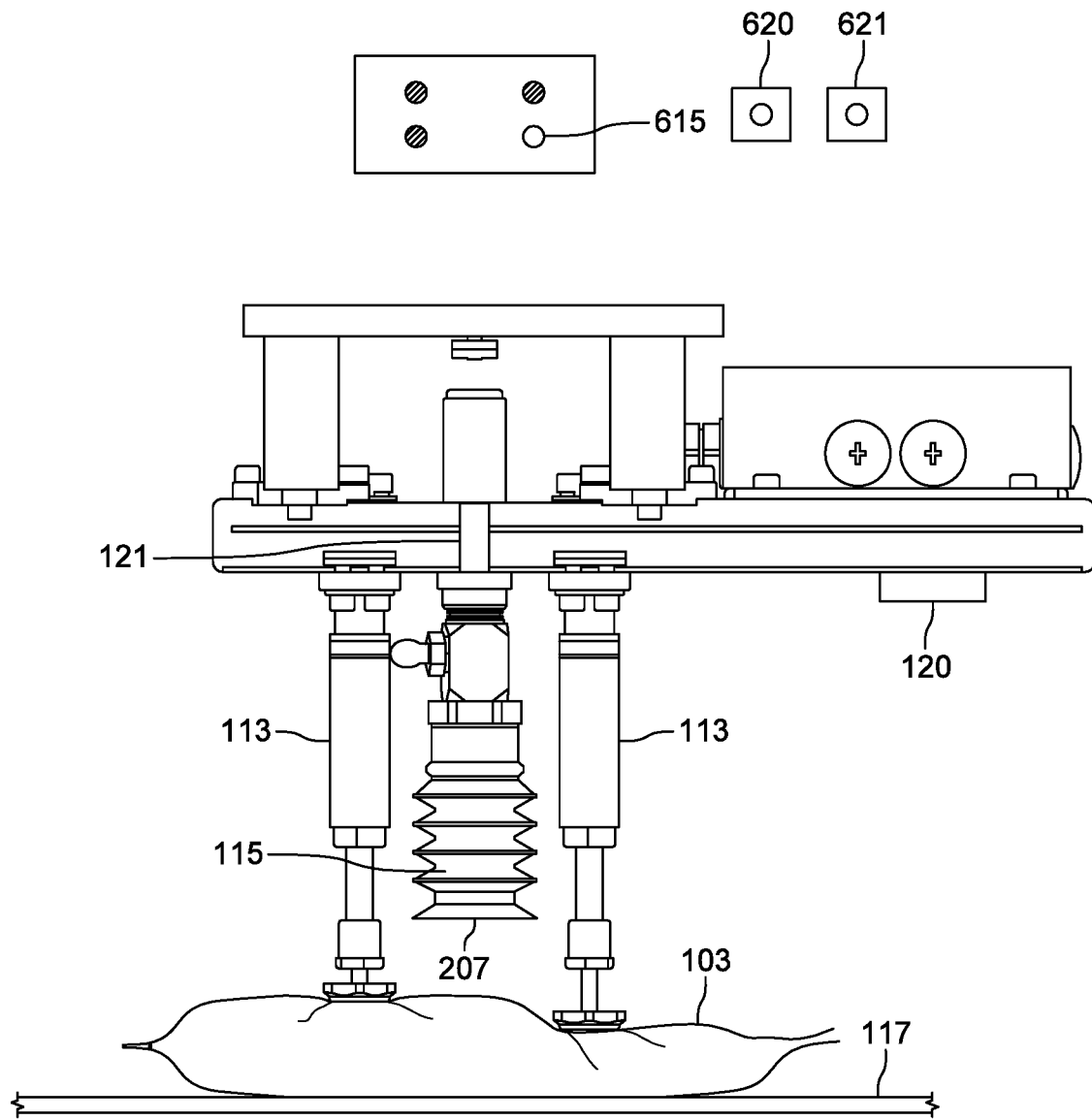

FIG. 6A shows that the end-of-arm tool 107 as guided by the vision system 109 is oriented and positioned over a sealable bag 103 on a conveyor 117. FIG. 6B shows that displaceable fingers 113 fingers are brought into contact with the sealable bag 103. FIG. 6C shows that the end-of-arm tool 107 is further pressed against the sealable bag 103, causing the displaceable fingers 113 to displace and to trigger accompanying sensors 206. If the sealable bag is properly sealed, the displaceable fingers become displaced by more than a predetermined amount and this is registered by the sensors, which is in turn displayed by the turning "ON" of corresponding LED lights 609. As shown in FIG. 6D, if the sealable bag is determined to be sufficiently sealed, as indicated by adequate displacement of all of the displaceable fingers 113 and subsequent turning "ON" of the LED lights 609, a retrieving member 115 with a suction mechanism 207 is extended to the sealable bag 103 and actuated in preparation for movement of the sealable bag 103. In FIG. 6E, the sealable bag 103 is lifted from the conveyor 117 in preparation for packaging into a box. FIG. 6F shows an alternative scenario in which the sealable bag 103 is not sufficiently sealed. In FIG. 6F, one of the displaceable fingers 113 fails to displace, as a result of a ruptured seal which causes inadequate resistance to all of the fingers. As a result, one of the corresponding LED light remains in an "OFF" position 615, thus indicating that the displaceable finger 113 was not displaced past a predetermined amount, and thus indicating that the sealable bag is not properly sealed. In such an embodiment, a vacuum switch 120 and/or optical sensor 121 validate that the bag 103 remains engaged with retrieving member 115 during transport. LED lights 620 and 621 are in communication with the vacuum switch 120 and optical sensor 121, respectively, and indicate whether or not the bag 103 has remained engaged with retrieving member 115 during transport. For example, in FIG. 6C LED light 620 turns "on" 621*a* to indicate that the optical sensor has positively detected the bag 103 and that the bag is ready for transport. In FIGS. 6D and 6E, LED light 620 and 621 are both "on", as indicated by 620*a* and 621*a*, respectively, to confirm that the bag 103 maintains contact with the suction mechanism 207 during transport.

Figure 7:
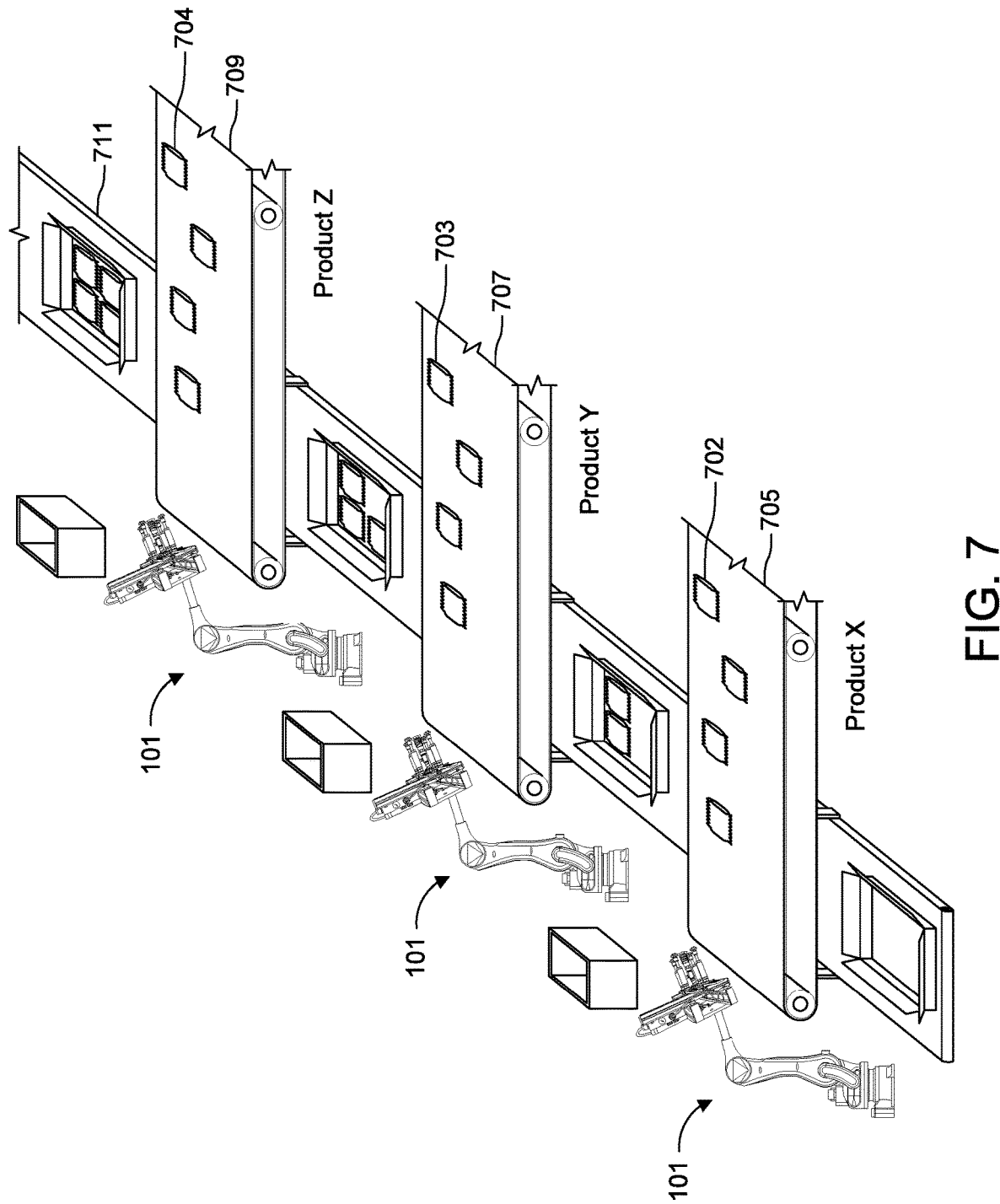
FIG. 7 is an illustrating depicting multiple stations for packaging a variety of different products (products X, Y and Z) into a box according to an embodiment of the disclosure herein.

FIG. 7 shows an embodiment of the disclosure where multiple systems 101 for automated sorting of sealable bags 702, 703, 704 are used in tandem to sort sealable bags containing different products. In FIG. 7, at least three different products (Products X, Y, and Z) are carried on different conveyors, 705, 707, 709, for automated sorted by individual systems 101. If the sealable bag 702, 703, or 704 is determined by the system 101 system to be properly sealed, the sealable bag 702, 703, or 704 is removed from the conveyer, 705, 707, or 709, respectively, and placed into a package on a different conveyor 711. In such a set-up, multiple sealable bags carrying different products can be simultaneously sorted and packaged into a single container for export/sale.

The embodiments illustrated and discussed in this specification are intended only to teach those skilled in the art how to make and use the disclosure herein. In describing embodiments of the disclosure herein, specific terminology is employed for the sake of clarity. However, the disclosure herein is not intended to be limited to the specific terminology so selected. The above-described embodiments of the disclosure herein may be modified or varied, without departing from the disclosure herein, as appreciated by those skilled in the art in light of the above teachings. It is therefore to be understood that, within the scope of the claims and their equivalents, the disclosure herein may be practiced otherwise than as specifically described.

The invention claimed is:

1. An automated method for sorting sealable bags comprising:

conveying a sealable bag to an inspection station;

moving a robotic arm having an end-of-arm tool mechanically mounted to the robotic arm towards the sealable bag preparatory to application of pressure to the sealable bag;

determining whether the sealable bag is fully sealed or not fully sealed by applying pressure to the sealable bag using the end-of-arm tool;

responsive to a determination that the sealable bag is not fully sealed, moving the sealable bag to a discard station; and responsive to a determination that the sealable bag is fully sealed, moving the sealable bag to a packaging station.

2. The method according to claim 1, wherein the end-of-arm tool includes a plurality of displaceable fingers, and wherein the determination of whether the sealable bag is fully sealed or not fully sealed comprises a determination of whether all or less than all of said plurality of displaceable fingers in contact with the sealable bag are displaced by more than a predetermined amount.

3. The method according to claim 2, wherein the plurality of displaceable fingers are configured in an orientation corresponding to a dimension of the sealable bag.

4. The method according to claim 2, wherein each of the plurality of displaceable fingers is displaceable in an axial direction, and wherein the determination of whether all or less than all of said plurality of displaceable fingers in contact with the sealable bag are displaced by more than the predetermined amount comprises a determination of whether all or less than all of said plurality of displaceable fingers in contact with the sealable bag are displaced axially by more than the predetermined amount.

5. The method according to claim 1, wherein the end-of-arm tool includes a retrieving member for moving the sealable bag to the discard station or to the packaging station.

6. The method according to claim 1, further comprising the step of determining orientation of the sealable bag at the inspection station using a vision system, and further comprising the step of orienting the end-of-arm tool for conformity with the determined orientation of the sealable bag at the inspection station.

* * * * *